(No Model.) 5 Sheets—Sheet 1.
F. G. BECKER.
HARVESTER REEL.

No. 349,973. Patented Sept. 28, 1886.

WITNESSES
Ed. A. Newman,
Al. C. Newman.

INVENTOR
Fred G. Becker,
By his Attorneys (No Model.)  F. G. BECKER.  5 Sheets—Sheet 2.
HARVESTER REEL.
No. 349,973.  Patented Sept. 28, 1886.
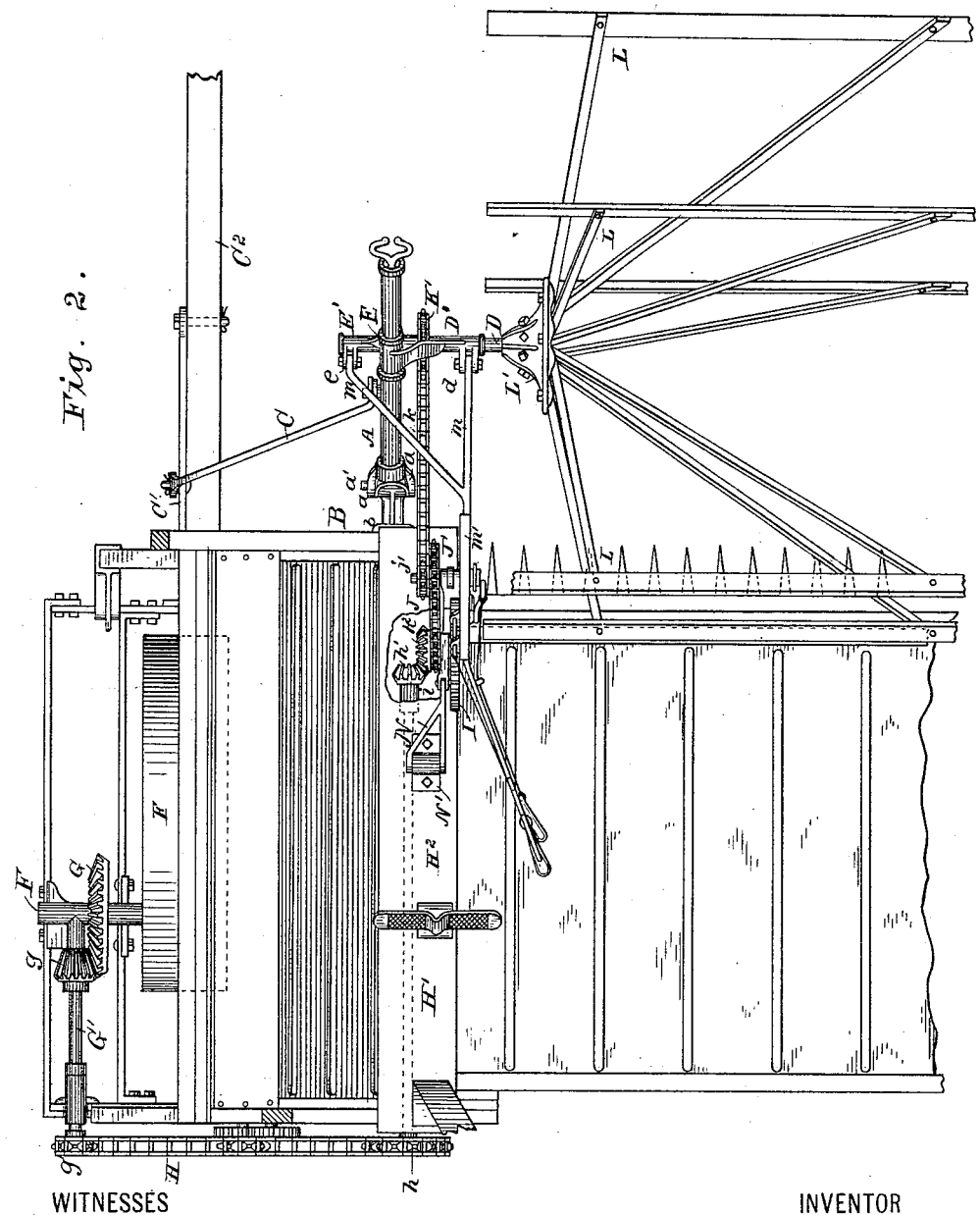
WITNESSES  INVENTOR
Ed. A. Newman.  Fred G. Becker.
Al. C. Newman.  By his Attorneys

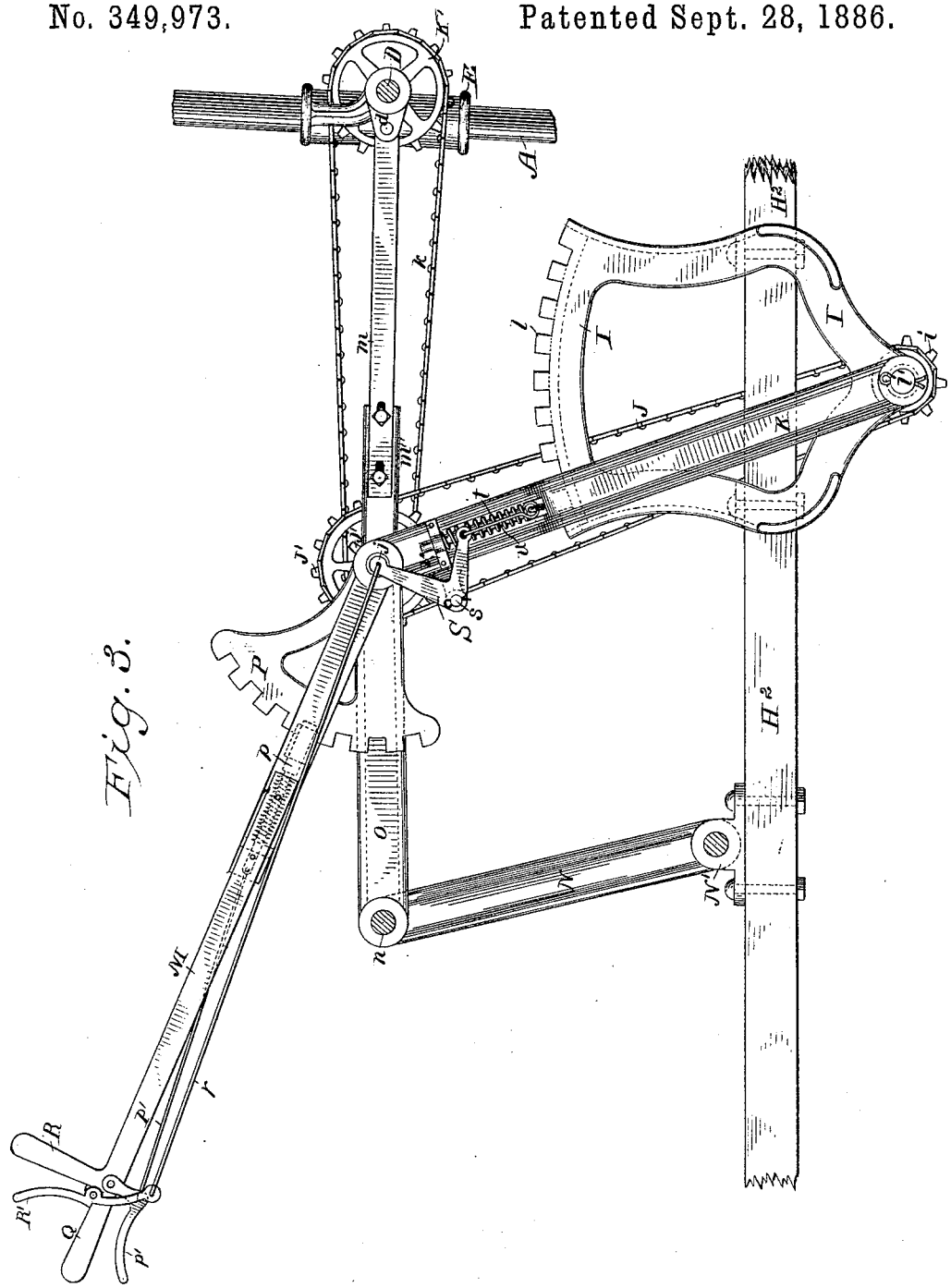

(No Model.) 5 Sheets—Sheet 4.
F. G. BECKER.
HARVESTER REEL.
No. 349,973. Patented Sept. 28, 1886.
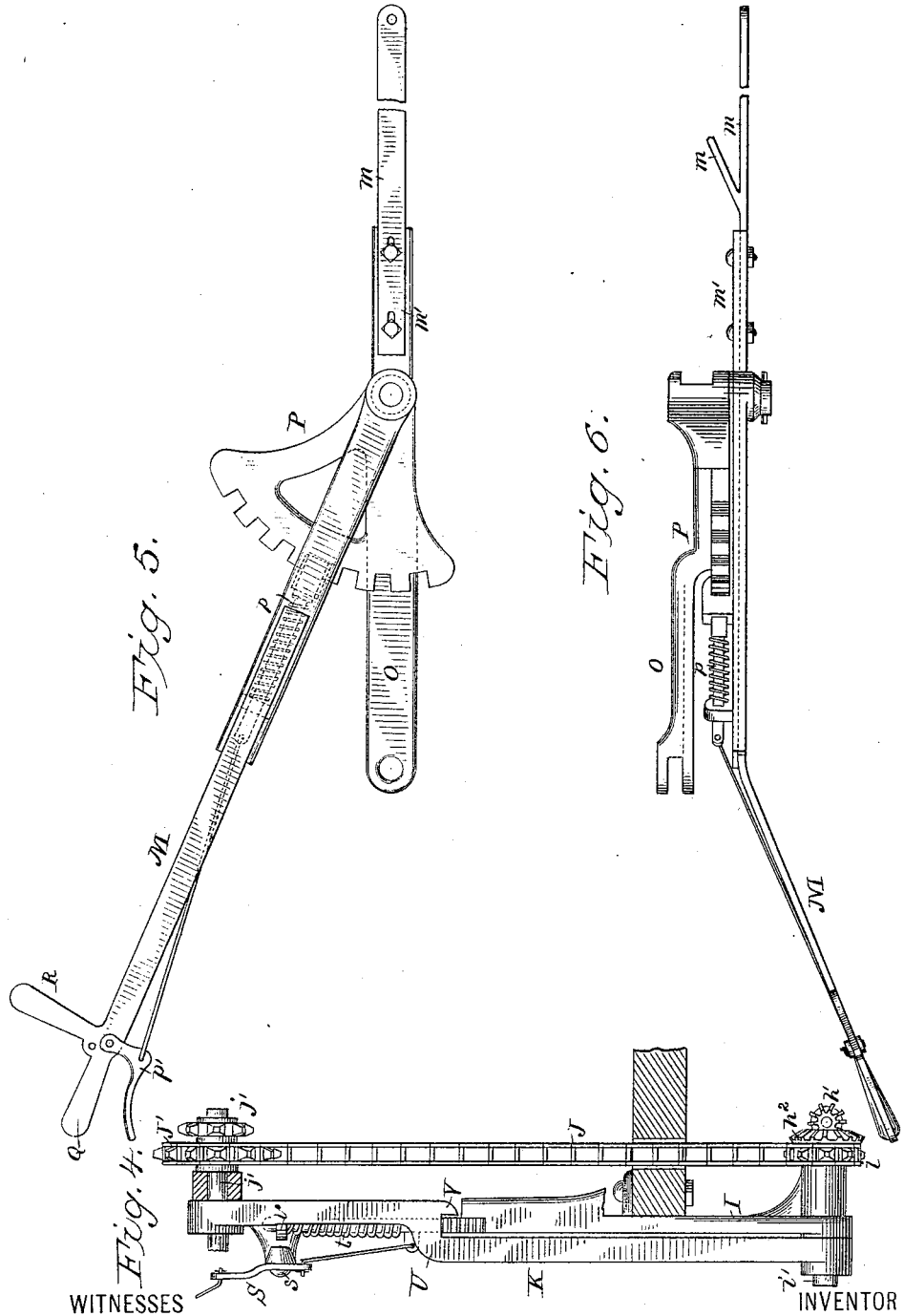
WITNESSES
Ed. A. Newman.
Al. C. Newman.
INVENTOR
Frederick G. Becker,
By his Attorneys (No Model.) 5 Sheets—Sheet 5.
F. G. BECKER.
HARVESTER REEL.

No. 349,973. Patented Sept. 28, 1886.

WITNESSES
E. A. Newman
C. M. Newman

INVENTOR
Frederick G. Becker.
By his Attorneys

UNITED STATES PATENT OFFICE.

FREDERICK G. BECKER, OF BROCKPORT, NEW YORK, ASSIGNOR TO D. S. MORGAN & COMPANY, OF SAME PLACE.

HARVESTER-REEL.

SPECIFICATION forming part of Letters Patent No. 349,973, dated September 28, 1886.

Application filed September 3, 1885. Serial No. 176,088. (No model.)

*To all whom it may concern:*

Be it known that I, FREDERICK G. BECKER, of Brockport, in the county of Monroe and State of New York, have invented certain new and useful Improvements in Harvester-Reels, of which the following is a specification.

My invention relates to improvements applicable to harvester-reels of the class which rotate about horizontal axes and are vertically and horizontally adjustable; and my object, mainly, is to provide a novel organization of mechanism for supporting, driving, and adjusting a reel, so that by way of a single controlling-lever the reel may be either raised or lowered or moved forward or backward.

In the accompanying drawings my improvements are shown as applied to a grain-binding harvester. Only those features of the machine are shown illustration of which is thought to be needed to convey a proper understanding of a suitable adaptation of my improvements which may, in whole or in part, be applied to machines differing more or less from that in this instance partially represented.

Figure 1:
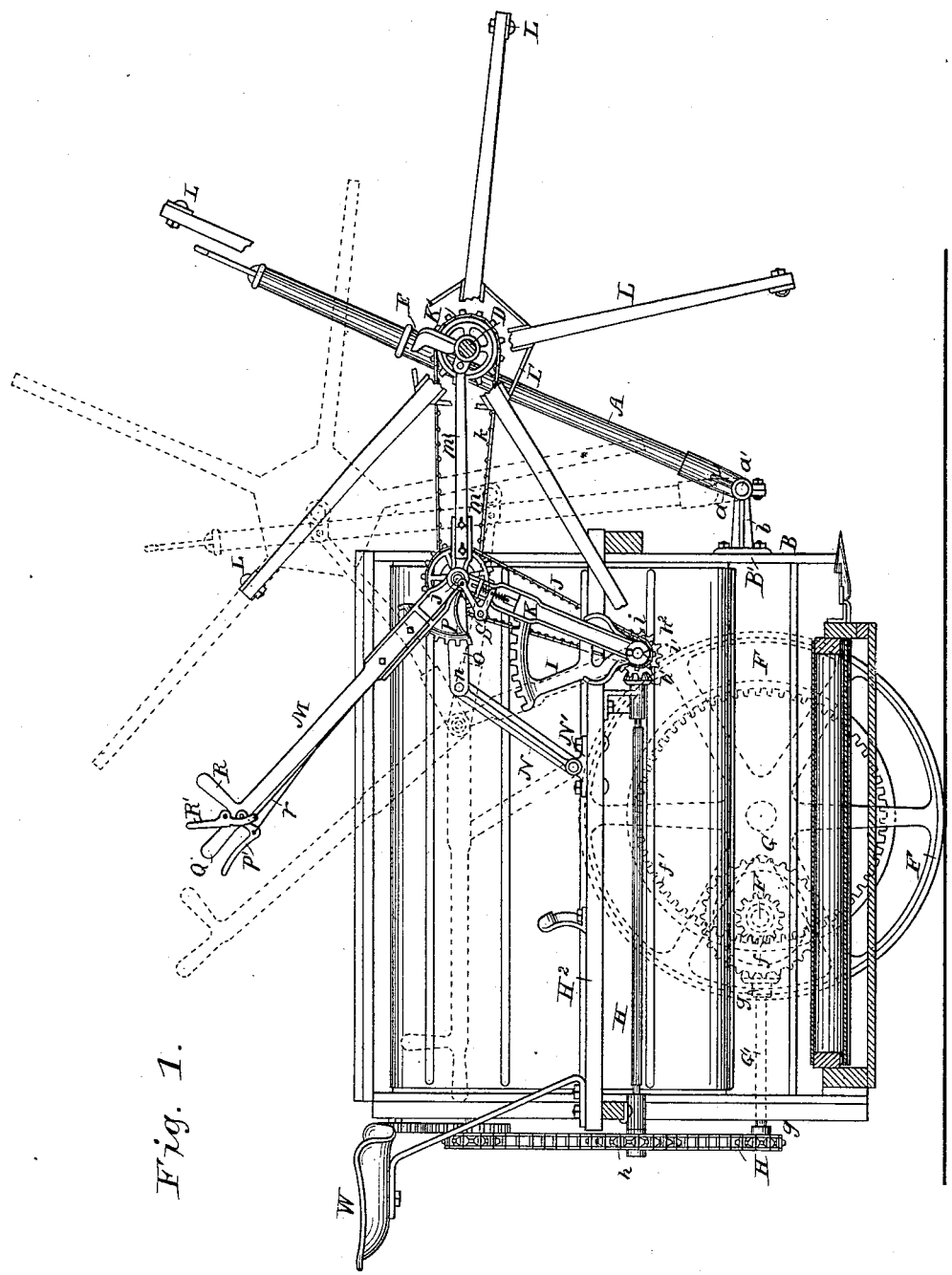
Figure 7:
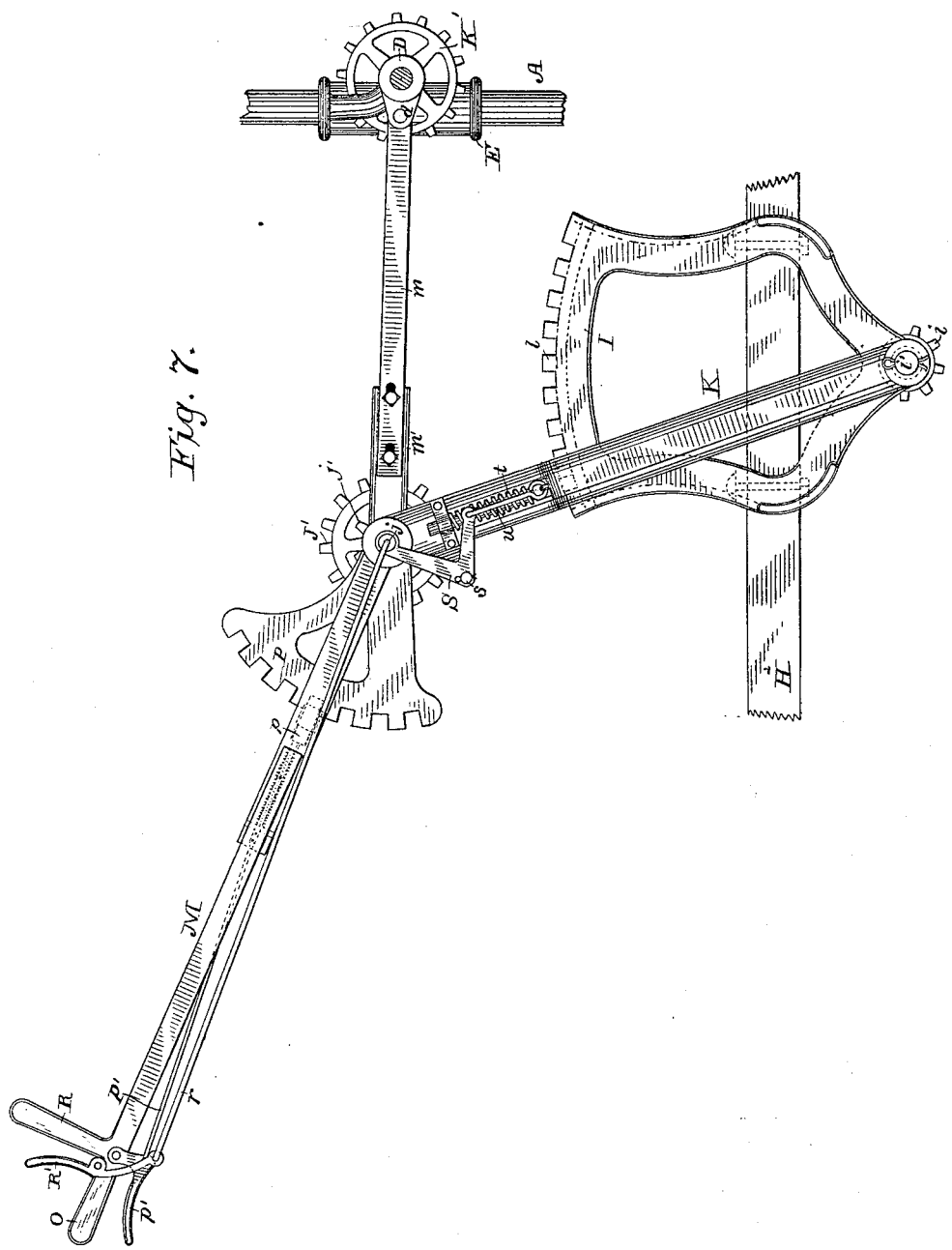

Figure 1 is a view, partly in vertical section and partly in elevation, as seen from the inner or grain side, with parts broken away and portions of the mechanism represented in different positions by full lines and dotted lines. Fig. 2 is a plan or top view, parts being broken away and other parts omitted. Figs. 3 to 7, inclusive, are detail views on an enlarged scale, Fig. 3 being an elevation from the inner side, Fig. 4 a front elevation with the seat-beam in section, Fig. 5 an elevation from the inner side, Fig. 6 a top view of parts shown by Fig. 5, and Fig. 7 an elevation from the inner side representing a modification.

A rocking or vertically-vibrating reel-post, A, has supporting connection at its lower end with the main frame B of the machine at front, near its inner side.

As shown, the reel-post is constructed and pivotally supported as follows: The reel-post is tubular, and at its lower end is provided with a bifurcated section screwed or otherwise suitably secured to it. The arms $a$ of this section are perforated, and a pivot-bolt, $a'$, passes through them and through a bearing-perforation in a reel-supporting frame-bracket, $b$, the outer end of which is embraced by the arms. The reel-supporting bracket at its inner end, is strongly secured, as by bolts and nuts, to a main-frame bar, B'. The reel-post has also bracing connection with the main frame, so that while allowed to rock it is maintained in the same vertical plane parallel or substantially parallel with the tongue throughout its movements.

As shown in Fig. 2, a lateral brace, C, making connection between the reel-post and main frame, is jointed in obvious way at its outer and inner ends, respectively, to the reel-post at a suitable distance from its lower end, and to a frame-bracket, C', with the outer end of which the tongue $C^2$ has pivotal connection. The respective jointed connections between the lower end of the reel-post and its supporting bracket and the inner end of the brace and the frame-bracket C', near the outer or stubble side of the machine, are in the same vertical plane, as well as in a common horizontal plane, for an obvious reason. A reel-shaft, D, has supporting connection with the reel-post in such manner that the reel-shaft may be adjusted up and down the reel-post. As shown, a sliding sleeve, E, on the reel-post, and a forked sleeve-bearing, D' E', for the reel-shaft, are formed by casting them together. The adjacent or inner ends of the members D' E' of the sleeve-bearing are sufficiently far apart to admit between them a sprocket-wheel detachably secured to the reel-shaft and forming part of the reel-driving mechanism, soon to be described. The member D' of the sleeve-bearing is provided with a bifurcated lug, $d$, and the other member with a similar lug, $e$. By means of these lugs jointed connection is made between the reel-adjusting mechanism, in turn to be described, and the reel-post by way of the sleeve-bearing and sliding sleeve.

The reel-driving mechanism, as shown, is as follows: A shaft, F, is driven by means of a pinion, $f$, fast on it and meshing with the internal gear, $f'$, of the driving-wheel F'. A bevel-gear, G, fast on this shaft F, drives a counter-shaft, G', by way of the bevel-pinion $g$, fast thereon. A sprocket-wheel, $g'$, fast on the counter-shaft, connects by a chain, H, with a sprocket-wheel, $h$, fast on the rear end of a shaft, H', mounted near its opposite ends in suitable bearings beneath the seat-beam H² of the frame. At its front end this driven shaft H' has a fast bevel-pinion, h', which engages a bevel-gear, h², rotating about a suitable pivot or journal formed with or rigidly secured to the lower end of a supporting-bracket, I, firmly fastened to the seat-beam of the frame in obvious way. This bracket at its upper end is formed with teeth constituting a detent-rack. A sprocket-wheel, i, formed with or rigidly secured to the gear h², so as to rotate with it, is connected by a chain, J, with a sprocket-wheel, J', rotating about a pivot or journal, j, formed with or rigidly secured to the upper end of a vertically-rocking lever, K, which at its lower end is supported by and rocks about the pivot i' of the supporting-bracket I. A sprocket-wheel, j', formed with or rigidly secured to the sprocket-wheel J', is connected by a chain, k, with the sprocket-wheel K', which is removably fastened upon and imparts rotation to the reel-shaft. A suitable number of reel bats or beaters, L, are connected in suitable well-known way with a reel head or carrier, L', fast on the reel-shaft.

The above-referred-to lever K and supporting-bracket I and detent l are elements of the reel-adjusting mechanism, which in other respects is as follows: A controlling-lever, M, by way of which all adjustments of the reel are governed, is fulcrumed on the pivot j of the lever K, so as to rock about an axis common to the wheels J' j', and provided with a forwardly-projecting arm, bifurcated to form the branches m m, which are pivoted to the lugs d e of the sleeve-bearing for the reel-shaft. This bifurcated arm is shown as adjustably fastened to a short arm, m', formed with the controlling-lever in order that the parts may be properly set to maintain the chain k under suitable tension. Slots or elongated bolt-holes in the bifurcated arm, and bolts passing through these slots and through the rigid arm m' of the lever and provided with nuts, serve to make the adjustable connection between the parts, as will readily be understood. The controlling-lever is bent outward, to suitably locate its rear end relatively to the driver's seat W. A vertically-rocking arm, N, having pivotal supporting connection at its lower end with the main frame by way of a bracket, N', fast to the seat-beam H², has jointed connection at its upper end with the upper end of the lever K, by means of a link-arm, O. The rear end of this link-arm is jointed to the upper end of the rocking arm N by the pivot n, and the pivot j serves to joint the front end of the link-arm to the lever K. The lower end of the arm N is bifurcated (see Fig. 2) for strongly connecting it by the pivot n' with the bracket N'. A detent-rack, P, rigid with the link-arm, is arranged in certain relation to the pivot j, as shown, and the controlling-lever is provided with a spring-actuated sliding detent, p, which is connected by a link, P', and pivoted actuating-handle p' with the end of the controlling-lever, convenient to the hand of the operator when grasping the handle Q of the controlling-lever. This lever is provided with another handle, R, projecting laterally to the straight handle Q, and with a second pivoted handle, R', close to this lateral handle. This pivoted handle R' serves, by way of the link-rod r and an elbow-lever, S, to operate a sliding spring-actuated detent, t, which engages with the detent-rack l of the bracket I. The elbow-lever has pivotal supporting connection at s with the lever K near its upper end, the upper arm of the elbow-lever being jointed to the link-rod r, and its lower arm jointed by a link, u, to the detent t. A side stud of the detent serves for connecting the lower end of the link u. The lower end of the detent passes through a suitable guide-slot in the curved or angular portion U of the lever K, and this lever is formed with a flange, V, to embrace and slide by the side of the detent-rack. The upper end of the detent t slides in a suitable guideway. (Shown as formed by the bracket v, secured to the lever K.)

It will be seen that by my improvements the controlling-lever has rocking supporting connection with the main frame-beam H², the rocking support for the controlling-lever being in this instance shown as formed by the vibrating lever K, rocking arm N, and link-arm O, and that by way of the single controlling-lever and its detent devices the reel may be adjusted either vertically or horizontally in the following way: To raise or lower the reel, the driver of the machine, when occupying the seat W, grasps the lever and detent-handles Q p', releases the detent p from its securing-rack, and rocks the lever up or down, as desired, thus lifting or lowering the reel by sliding the sleeve-bearing of the reel-shaft along the reel-post. The slight rocking movement imparted to the reel-post during ordinary vertical adjustments of the reel do not materially vary its position in a horizontal direction. When the reel requires horizontal adjustment, it is moved, as desired, by rocking the supporting connection between the main frame and the controlling-lever. To do this the lever and detent handles R R' are grasped, the detent t freed from its securing-rack, and by a pulling or a thrusting strain the reel-post is rocked back or forth as the lever K and arm N are rocked. Obviously there is imparted some vertical movement to the reel during horizontal adjustments, this movement being ordinarily desirable. In some positions of the parts the vertical movement so imparted is hardly appreciable. With both hands the driver can adjust the reel vertically and horizontally simultaneously.

I do not wish to be understood as confining my invention to the precise details of construction and arrangement hereinbefore specifically set forth, as my improvements may be modified in various respects. For instance, instead of the one bracket I to support the lever K and provide the detent l, separate brackets may be employed. The rocking arm N may be pivoted below instead of above the main frame-beam H². The lever K and arm N of the rocking support for the controlling-lever may be of the same length and pivoted in the same horizontal plane, so that their connecting link arm will always be horizontal or parallel with the seat-beam of the frame. The rocking arm N and link-arm O might be dispensed with, (see Fig. 7,) and the rocking support for the controlling-lever consists only of the lever K, in which event the rack P would be formed with or rigidly and strongly attached to this lever at the upper and inner side thereof.

I do not wish to be understood as unqualifiedly claiming controlling the vertical and horizontal adjustments of the reel by way of a single controlling-lever, as, broadly considered, this is old; nor as claiming a combination involving a rocking reel-post, a reel-shaft bearing adjustable both vertically and horizontally, a controlling-lever rigidly connected with said bearing, a rocking support to which the controlling-lever is pivoted, and detent devices for both locking the controlling-lever against pivotal movement and the support against rocking.

In accordance with my improvements it is essential that the reel-shaft bearing have jointed connection with the controlling-lever.

I claim as of my invention—

1. The combination of the main frame, the rocking reel-post having supporting and bracing connection therewith, the reel-shaft, its sleeve-bearing, the sleeve sliding on the reel-post and carrying the reel-shaft bearing, and the single controlling-lever of the reel-adjusting mechanism pivotally connected with the reel-shaft bearing, and by which the reel-post is rocked and the sliding sleeve on the reel-post moved lengthwise thereof, substantially as and for the purpose set forth.

2. The combination of the rocking reel-post, the bearing for the reel-shaft, the sliding sleeve by which said bearing has adjustable supporting connection with the reel-post, the controlling-lever having jointed connection with the reel-shaft bearing, the rocking support to which the controlling-lever is pivoted, detent mechanism by which to lock the lever against pivotal movement, and detent mechanism for locking its support against rocking, substantially as and for the purpose set forth.

3. The combination of the main frame, the rocking lever pivotally supported at its lower end, the rocking arm pivotally supported at its lower end, the link-arm jointed at its opposite ends to the upper ends of the rocking lever and rocking arm, respectively, the single controlling-lever having pivotal connection with the rocking lever, the rack l, the rack P, the detents for engaging these racks, the detent-actuating devices carried by the single controlling-lever, the reel-shaft bearing with which the controlling-lever has jointed connection, and the sleeve sliding on the reel-post and carrying the reel-shaft bearing, substantially as and for the purpose set forth.

4. The combination of the main frame, the controlling-lever, the rocking support with which the lever is pivotally connected, detent mechanism for preventing rocking movement of said support, detent mechanism for locking the lever to its rocking support, the rocking reel-post, the vertically-adjustable reel, its shaft, the forked bearing therefor, the sliding sleeve by which said bearing has adjustable connection with the reel-post and with which the controlling-lever has jointed connection, the sprocket-wheels of the reel-driving gearing rotating about the axes of oscillation of the controlling-lever and its rocking support, and the sprocket-wheel secured to the reel-shaft between the members of its bearing, substantially as and for the purpose set forth.

In testimony whereof I have hereunto subscribed my name.

FREDERICK G. BECKER.

Witnesses:
E. T. LAMB,
CHARLES IRWIN.